United States Patent Office 3,459,043
Patented Aug. 5, 1969

3,459,043
METHOD AND APPARATUS FOR MEASURING TEMPERATURE
Robert Eric Young, 12 Whitnash Road,
Leamington Spa, Warwickshire, England
Filed July 5, 1966, Ser. No. 562,570
Int. Cl. G01k *5/18;* G01l *9/08*
U.S. Cl. 73—362                     8 Claims

ABSTRACT OF THE DISCLOSURE

Where a temperature is indicated by a column of liquid, as in a mercury-in-glass thermometer, this column of liquid is arranged to effect the inductance of a coil included in the circuit of a self-sustaining oscillator circuit so that the frequency, or the change in frequency, is a measure of the temperature.

---

This invention relates to a method of, and means for, measuring pressure or temperature.

According to the invention, there is provided a method of measuring pressure or temperature comprising utilizing the change in position of a column of liquid in an inductance coil to vary its inductance, and measuring the inductance or variation therein to provide a measurement of pressure or temperature.

For measuring the pressure of a fluid at a predetermined part of a system through which the fluid passes, the pressure adjusts the position of the column of liquid and the inductance coil may form part of an oscillatory circuit, the change in inductance being measured by measuring the new resonant frequency, or the corresponding variation in the resonant frequency, of the circuit.

Temperature may be measured by utilizing the change in position of the column of expansive liquid in a liquid-in-dielectric-tube type thermometer in the inductance coil.

Also according to the invention there is provided means for measuring pressure or temperature comprising a tube of dielectric material having a column of liquid therein, the position of which is adjusted by the pressure or temperature to be measured, an inductance coil arranged about the tube so that variation of the position of the column of liquid varies the inductance of said coil, and means for measuring the inductance or the variation in inductance cause thereby to provide the measurement of pressure or temperature.

Means for measuring the difference in pressure of a fluid between spaced points in a system through which the fluid passes, may include respective tubes, of a dielectric material, communicating with the two points of the system normally to the direction of flow, when the static pressure of the fluid at each point will adjust the position of a liquid in the tube, a respective electrical inductance coil encircling each said tube and liquid, each coil forming part of an oscillatory circuit, and means for measuring the difference in the resonant frequencies of the two oscillatory circuits, such difference being a measure of the difference in pressure.

When the fluid to be measured is a liquid it may constitute the column of the liquid which coacts with the inductance coil. The, or each tube, as appropriate, may include a displaceable septum which is arranged to transmit the static pressure from the system to a standard liquid forming the column which coacts with the inductance coil. If the aforesaid standard liquid is mercury, or a similar material, the septum can be omitted.

Any suitable known means can be employed for measuring the resonant frequency or frequencies of the oscillatory circuits, and in the case where a single tube is employed this is preferably done by connecting the inductance coil in an oscillatory electrical circuit containing a suitable resonant frequency measuring device. Similarly, and when there are two of the tubes, the means for measuring differences in the resonant frequencies of the corresponding oscillatory circuits can include connecting each oscillatory circuit in a common electrical circuit, and applying the signals from the two oscillatory circuits to a common frequency measuring device.

The oscillatory circuit may form part of an oscillator, the output of which is compared with the output of a pre-fixed oscillator, the difference frequency impulses providing a digital representation of the pressure or temperature being measured. The output of the two oscillators may be compared in a beat frequency mixer. Alternatively the outputs of the two oscillators may be compared by feeding one output to the "forward count" input of a reversible or bi-directional counter and the other input to the "backwards count" input of the counter, the resultant count output of the counter providing a digital representation of the pressure or temperature being measured.

Embodiments of the invention will now be described, by way of example, with reference to the accompanying drawings, in which.

Figure 1:
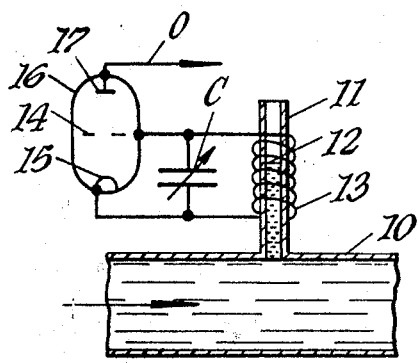
FIGURE 1 is a diagram of one form of apparatus for measuring the pressure of a liquid in a pipe.

Referring first to FIGURE 1 the liquid of which the pressure is to be measured is contained in a tube 10 having an upright, lateral, open-topped limb 11 into which the liquid is urged by its static pressure up to a level indicated at 12. The tube and its limb are of an electrically insulating material, and wound on the limb is an inductance coil 13, which with a variable capacitor C, form an oscillatory circuit which, connected between the grid 14 and cathode 15 of a triode valve 16. The output O from the anode 17 of the valve is applied to any suitable frequency-measurring device (not shown). Prior to making a measurement the capacitor is adjusted, while the limb 11 is empty, until valve 16 oscillates at a desired datum frequency, and for making the measurement the liquid is permitted to enter the limb. The effect of the liquid in passing within the turns of the coil 13 is to vary its inductive effect so that the frequency of the oscillatory circuit is varied to an extent which can be read from the frequency-measuring device; and it will be seen that in the case of any given fluid the device could be calibrated in terms of pressures.

Figures 2, 3:
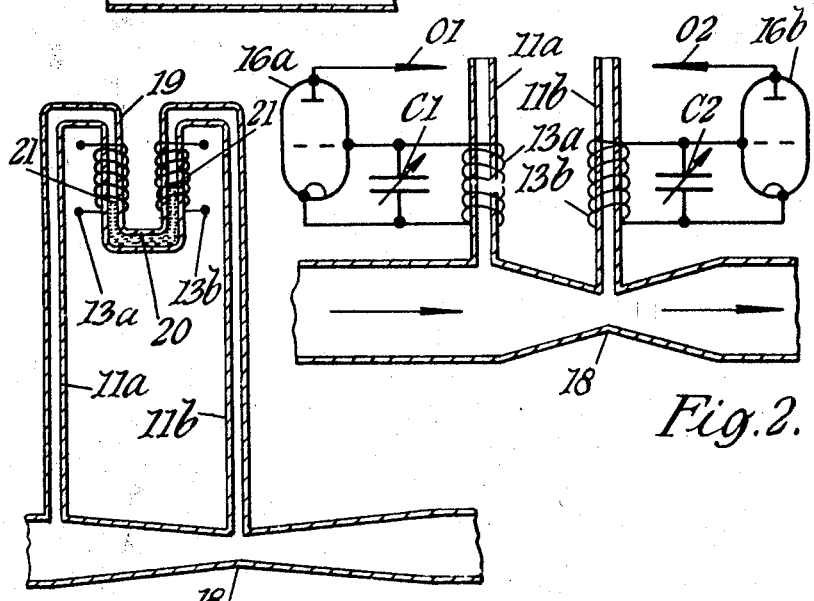
FIGURE 2 is a similar diagram showing one form of apparatus for measuring the pressure drop across a venturi in a liquid flow system.
FIGURE 3 is also a similar diagram showing how the apparatus of FIGURE 2 is modified when the pressures to be measured are high.

In the construction illustrated by FIGURE 2, which is for measuring the pressure drop across a venturi 18 when the pressures involved are low, one of the open-topped lateral limbs 11a is provided at the upstream end of the venturi throat, and the throat itself is provided with another, which is indicated at 11b. The limbs 11a and 11b, have respective inductance coils 13a, 13b wound about them, and the ends of the inductance coils are connected to the cathodes and grids of respective thermionic valves 16a, 16b. The inductance coils are shunted as before by variable capacitances C1 and C2, and the anodes of the valves are connected to a frequency measuring device (not shown) for their signals O1 and O2 to be applied thereto. In this way the frequency measuring device will give an indication of the difference between the pressures in the two limbs, or, in other words, the pressure drop across the venturi, measured in terms of the difference between the frequencies of the two oscillatory circuits caused by the different extents to which the liquid is within the coils.

When, however, the pressures in the venturi are high it is arranged, as shown in FIGURE 3, for the outer ends of the two limbs 11a and 11b sealingly to communicate with the upper ends of a manometric tube 19 having a sealing liquid 20 (e.g., mercury) at the junction of its limbs; and in this case the inductance coils are arranged about the limbs of the manometric tube. The two inductance coils 13a and 13b are connected in respective oscillatory circuits like those shown in FIGURE 2, and the frequencies of the two circuits will vary according to the different extents to which the fluid and mercury columns are within the coils.

Conveniently, short columns of oil, or a similar separation medium, are floated on the mercury, and use can be made of such separation media or of slugs 21 of solid material (e.g., sintered iron powder) floated thereon, or on the mercury if the separation media be not used, for rendering negligible the effect of the dielectric constant of the fluid on the two inductance coils in cases where the tuning effect of the fluid is impracticably small.

Figure 4:
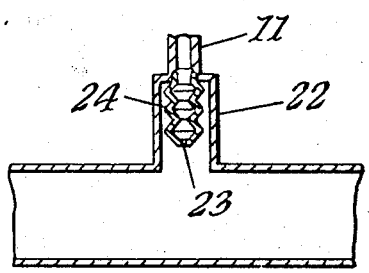
FIGURE 4 is a similar view of a modified form of a portion of apparatus of FIGURES 1, 2 or 3.

The modification illustrated by FIGURE 4 shows that instead of the tube limb 11 communicating with the main tube 10, the latter is formed with a lateral chamber 22 containing a displaceable septum 23, (e.g., of an aneroid chamber 24) so that the fluid in the main tube 10 is not of itself relied upon to produce the column within the inductance coil 13. Instead, use is made of another liquid in the tube limb 11, and at the pressure-responding side of the aneroid wall, for the purpose.

Obviously this last modification can equally well be applied to the constructions shown in FIGURES 2 and 3.

Instead of the inductance coils being wound around the tube limbs, the latter could be moulded plastic or ceramic material with the coils embedded in them, and instead of using thermionic valves in the oscillatory circuits, transistors or other suitable semi-conductor devices could be employed.

Figure 5:
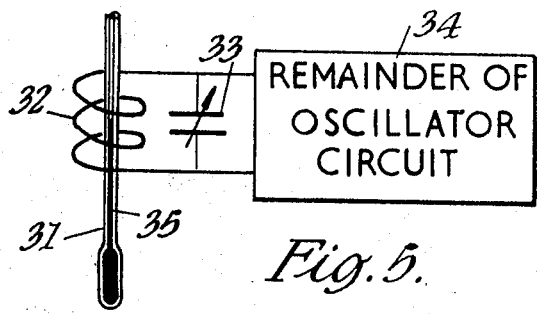
FIGURE 5 is a part schematic diagram of a mercury in glass thermometer in accordance with the invention.

Referring to FIGURE 5, there is shown a mercury in glass thermometer 31 about the stem of which is an inductance coil 32 arranged with capacitor 33, to form a resonant circuit which together with block 34 form an oscillator. Variation in the position of the head of the column of mercury 35 within the coil 31 due to temperature changes varies the inductance of coil 31 and so varies the frequency of the oscillations. Thus, the measurement of the frequency of the oscillations provides a measure of the temperature.

Figure 6:
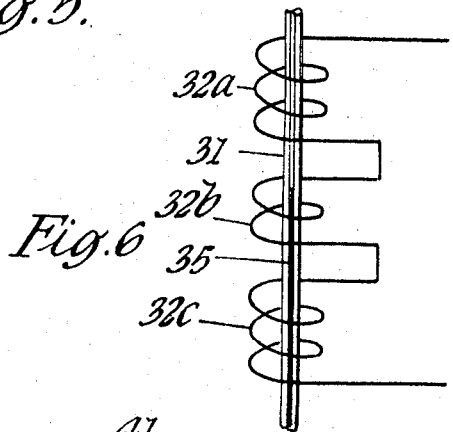
FIGURE 6 is a schematic diagram showing the inductance coil divided in three parts.

FIGURE 6 shows the inductance split into three sections 6a, 6b and 6c. By splitting the inductance into three or more sections and adjusting their relative dispositions along the stem of thermometer 31, the law of change of frequency of oscillation against change in temperature, may be varied.

Figure 7:
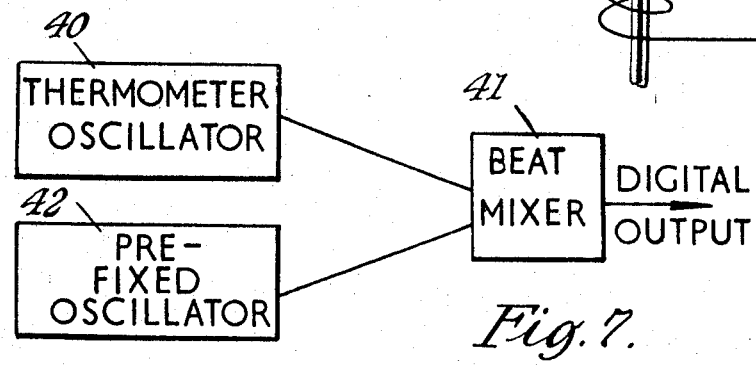
FIGURE 7 is a block schematic diagram of a beat frequency arrangement to obtain a digital output.

FIGURE 7 shows schematically an arrangment for obtaining a digital output, the oscillations of thermometer oscillator arrangement 40 are fed to a beat frequency mixer 41 together with the output oscillations of a pre-fixed frequency oscillator 42. The beat frequency impulses per unit of time at the output of mixer 41 provide a digital representation of the temperature being measured by the thermometer 31. Oscillator 42 is arranged to be preadjusted in frequency to allow the zero point to be pre-set.

Figure 8:
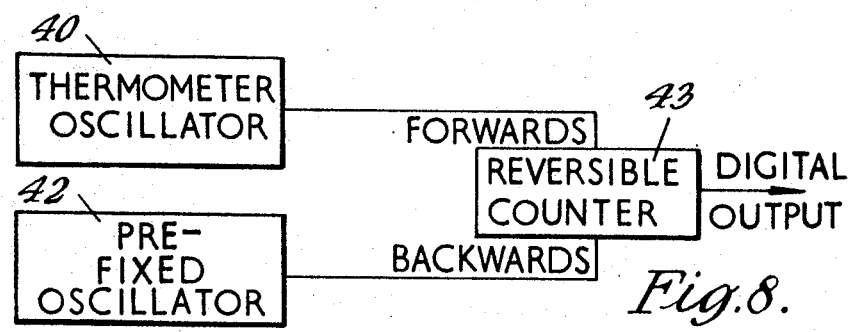
FIGURE 8 is a block schematic diagram of a reversible counter arrangement to obtain a digital output.

FIGURE 8 shows an alternative arrangement for providing a digital output. In this arrangement the outputs of thermometer oscillator 40 and pre-fixed oscillator 42 are fed to a reversible or bi-directional counter 43, one to the "forwards count" input and the other to the "backwards count" input. The resultant count output per unit of time provides a digital representation of the temperature being measured by the thermometer.

The arrangement shown in FIGURES 6, 7 and 8 may equally well be used in conjunction with the pressure measuring arrangments.

The law of change of frequency of oscillation against change in pressure or temperature may be modified by providing a fixed central ferrite or the like core within the tube containing the column of liquid. The core may be shaped, by varying its diameter along its length in a predetermined manner to control the frequency change characteristic. As an alternative the ferrite or like core may be hollow and arranged outside the tube and coil. A ferrite core as described may also be used in conjunction with a coil which is split into sections.

What is claimed is:

1. Means for measuring temperature comprising a tube of dielectric material having a column of liquid therein, the length of which is adjusted by the temperature to be measured, an inductance coil arranged about said tube so that variation of the length of the column of liquid directly varies the inductance of said coil, said inductance coil forming part of an oscillatory circuit of a self-sustaining oscillator circuit and the change in temperature is measured by a frequency measuring device arranged to measure the new frequency of the oscillator circuit or the change in the frequency, due to variation in the inductance of said coil caused by variation in the length of said liquid.

2. Means as claimed in claim 1 wherein said inductance coil is in three or more sections.

3. Means as claimed in claim 1 wherein said tube is a thermometer of the expansive liquid-in-dielectric-tube type.

4. Means as claimed in claim 3 wherein the output of the oscillator is compared with the output of a pre-fixed oscillator, the difference frequency impulses providing a digital representation of the temperature being measured.

5. Means as claimed in claim 4 wherein the outputs of the two oscillators are compared in a beat frequency mixer.

6. Means as claimed in claim 4 wherein said outputs of the two oscillators are compared by feeding one said output to a "forward count" input of a reversible or bi-directional counter and the other said output to a "backwards count" input of said counter, the resultant count output of said counter providing a digital representation of the temperature being measured.

7. A method of measuring temperature comprising the steps of subjecting a column of liquid to the temperature to be measured; adjusting the length of said liquid, by said temperature; directly affecting the characteristics of an inductance coil by said length adjustment, which coil surrounds the upper portion of said liquid column; providing a self-sustaining oscillator circuit, said inductance coil forming a part of an oscillatory circuit thereof; and determining the frequency of oscillations of said self-sustaining oscillator circuit, which frequency is a measure of temperature.

8. A method as claimed in claim 7 wherein said liquid in the column is an expansive liquid, and said column of liquid is a thermometer of the liquid-in-dielectric-tube type.

References Cited

UNITED STATES PATENTS

| | | | |
|---|---|---|---|
| 2,349,963 | 5/1944 | Harrison | 73—205 XR |
| 2,357,745 | 9/1944 | Kliever | 73—398 XR |
| 2,363,690 | 11/1944 | Razek | 73—205 XR |
| 2,680,968 | 6/1954 | Cockett | 73—398 |
| 2,939,072 | 5/1960 | Bell | 73—398 XR |
| 3,232,091 | 2/1966 | Glassey. | |
| 1,884,591 | 10/1932 | Davis | 331—66 XR |
| 2,158,844 | 5/1939 | Andrews | 331—66 XR |

FOREIGN PATENTS 350,950  6/1931  Great Britain.

LOUIS R. PRINCE, Primary Examiner

D. O. WOODIEL, Assistant Examiner

U.S. Cl. X.R.

73—368, 398